(12) United States Patent
Tsukagoshi

(10) Patent No.: US 10,809,870 B2
(45) Date of Patent: Oct. 20, 2020

(54) INFORMATION PROCESSING APPARATUS AND INFORMATION PROCESSING METHOD

(71) Applicant: SONY CORPORATION, Tokyo (JP)

(72) Inventor: Ikuo Tsukagoshi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/477,626

(22) PCT Filed: Jan. 31, 2018

(86) PCT No.: PCT/JP2018/003219
§ 371 (c)(1),
(2) Date: Jul. 12, 2019

(87) PCT Pub. No.: WO2018/147143
PCT Pub. Date: Aug. 16, 2018

(65) Prior Publication Data
US 2019/0369814 A1    Dec. 5, 2019

(30) Foreign Application Priority Data
Feb. 9, 2017  (JP) .................... 2017-022643

(51) Int. Cl.
*G06F 3/0481*  (2013.01)
*G06F 3/01*    (2006.01)
(Continued)

(52) U.S. Cl.
CPC ......... *G06F 3/0481* (2013.01); *G06F 3/011* (2013.01); *G06F 3/0485* (2013.01); *G06F 3/16* (2013.01)

(58) Field of Classification Search
CPC ..................................... G06F 3/0481
(Continued)

(56) References Cited

U.S. PATENT DOCUMENTS 6,404,442 B1 *  6/2002  Hilpert, Jr. ............ G06F 3/0481
                                                       715/700
6,570,588 B1 *  5/2003  Ando ..................... G06F 3/0481
                                                       715/728
(Continued)

FOREIGN PATENT DOCUMENTS

EP    3 089 011 A1    11/2016
EP    3 104 270 A1    12/2016
(Continued)

OTHER PUBLICATIONS

International Search Report dated Apr. 3, 2018, in PCT/JP2018/003219 filed on Jan. 31, 2018.
(Continued)

*Primary Examiner* — William D Titcomb
(74) *Attorney, Agent, or Firm* — Oblon, McClelland, Maier & Neustadt, L.L.P.

(57) ABSTRACT

To enable a visually impaired person to easily perform an operation by pointing at a desired position on a screen. Processing of detecting a pointing position of a user on a screen is performed. Processing of outputting a sound corresponding to the detected pointing position is performed. For example, in the sound output processing, when the detected pointing position is in a specific region on the screen, a sound indicating that the pointing position is the specific region is output. For example, in the sound output processing, a position corresponding to the detected pointing position is set as a sound image position.

19 Claims, 9 Drawing Sheets

(51) Int. Cl.
*G06F 3/0485* (2013.01)
*G06F 3/16* (2006.01)

(58) Field of Classification Search
USPC .......................................................... 715/716
See application file for complete search history.

(56) References Cited

U.S. PATENT DOCUMENTS

| | | | |
|---|---|---|---|
| 2001/0030640 A1* | 10/2001 | Yoneno | G06F 3/033 345/156 |
| 2004/0004600 A1 | 1/2004 | Yoneno et al. | |
| 2009/0207131 A1 | 8/2009 | Togami et al. | |
| 2012/0306775 A1 | 12/2012 | Miyachi et al. | |
| 2014/0168168 A1 | 6/2014 | Ichieda | |
| 2014/0245139 A1* | 8/2014 | Lee | G06F 3/04842 715/702 |
| 2015/0054739 A1 | 2/2015 | Itoh | |
| 2016/0188181 A1* | 6/2016 | Smith | G06F 3/045 715/765 |
| 2016/0364016 A1 | 12/2016 | Yoon et al. | |
| 2017/0025097 A1* | 1/2017 | Kuribayashi | G06F 3/147 |
| 2017/0031530 A1 | 2/2017 | Ikeda et al. | |
| 2017/0038892 A1 | 2/2017 | Ikeda et al. | |
| 2017/0039030 A1 | 2/2017 | Ikeda et al. | |
| 2017/0041581 A1 | 2/2017 | Ikeda et al. | |
| 2017/0205890 A1* | 7/2017 | Takimoto | G06F 3/017 |
| 2018/0011612 A1* | 1/2018 | Ozturk | G06F 3/0482 |
| 2018/0117465 A1* | 5/2018 | Voris | A63F 13/52 |
| 2019/0072638 A1* | 3/2019 | Wang | G01S 5/14 |

FOREIGN PATENT DOCUMENTS

| | | |
|---|---|---|
| JP | 2004-271748 A | 9/2004 |
| JP | 2007-52385 A | 3/2007 |
| JP | 2007-86856 A | 4/2007 |
| JP | 2010-74238 A | 4/2010 |
| JP | 2014-44268 A | 3/2014 |
| JP | 2014-520491 A | 8/2014 |
| JP | 2016-53767 | 4/2016 |

OTHER PUBLICATIONS

Extended European Search Report dated Oct. 31, 2019 in European Patent Application No. 18751603.4, 13 pages.
European Office Action dated Jun. 10, 2020, in European Application No. 18 751 603.4, 8 pgs.

* cited by examiner

INFORMATION PROCESSING APPARATUS AND INFORMATION PROCESSING METHOD

TECHNICAL FIELD

The present technology relates to an information processing apparatus and an information processing method, and more particularly to an information processing apparatus or the like that enables a user to perform an operation by pointing at a desired position on a screen.

BACKGROUND ART

Conventionally, for example, Patent Document 1 proposes an information processing apparatus that enables a user to perform an operation by pointing at a desired position on a screen. In this kind of information processing apparatus, a visually able-bodied person can easily perform the operation by pointing at a desired position on the basis of display on the screen. However, a visually impaired person has a great difficulty in performing the operation by pointing at a desired position on the screen.

Furthermore, for example, Patent Document 2 describes, as a stereo (3D) acoustic technology, a 3D audio rendering technology for mapping audio data of an object sound source to a speaker located at an arbitrary position on the basis of position information of the audio data.

CITATION LIST

Patent Document

Patent Document 1: Japanese Patent Application Laid-Open No. 2014-044268
Patent Document 2: Japanese Translation of PCT International Application Publication No. 2014-520491

SUMMARY OF THE INVENTION

Problems to be Solved by the Invention

An object of the present technology is to enable a visually impaired person to easily perform an operation by pointing at a desired position on a screen.

Solutions to Problems

The concept of the present technology resides in
an information processing apparatus including:
a control unit configured to control position detection processing of detecting a pointing position of a user on a screen, and sound output processing of outputting a sound corresponding to the detected pointing position.

In the present technology, the pointing position of the user on the screen is detected by the position detection processing. Then, the sound corresponding to the detected pointing position is output by the sound output processing. For example, the screen is displayed on a display unit, and an arbitrary position on the screen is pointed at by the user operation from the user operation unit.

For example, in the sound output processing, when the detected pointing position is in a specific region on the screen, a sound indicating that the pointing position is the specific region may be output. In this case, for example, the specific region may be a region of an application logo for activating a specific application arranged on the screen.

Furthermore, for example, in the sound output processing, when the detected pointing position is not on the screen, a sound indicating that this pointing position is outside the screen may be output. Furthermore, for example, in the sound output processing, when the detected pointing position is in a second specific region existing in a first specific region on the screen, a sound indicating that this pointing position is the second specific region may be output at a same time with an output of a sound indicating that this pointing position is the first specific region.

Furthermore, for example, in the sound output processing, processing of setting a position corresponding to the detected pointing position as a sound image position may be performed. Thereby, where on the screen the pointing position exists can be grasped from a direction in which the sound can be heard. In this case, for example, in the sound output processing, rendering processing according to object metadata corresponding to the detected pointing position may be performed in order to set the position corresponding to this pointing position as the sound image position.

In this case, for example, in the sound output processing, rendering processing according to object metadata prepared in advance in association with a position on the screen may be performed. Furthermore, in this case, for example, in the sound output processing, rendering processing according to object metadata obtained from the detected pointing position may be performed.

As described above, in the present technology, the sound corresponding to the pointing position is output. Therefore, a visually impaired person can easily perform an operation by pointing at a desired position on the screen.

Effects of the Invention

According to the present technology, a visually impaired person can easily perform the operation by pointing at a desired position on the screen. Note that the effects described in the present specification are merely examples and are not limited, and additional effects may be exhibited.

MODE FOR CARRYING OUT THE INVENTION

Hereinafter, a mode for implementing the present invention (hereinafter referred to as an "embodiment") will be described. Note that the description will be given in the following order.

1. Embodiment
2. Modification

1. Embodiment

[Configuration Example of Information Processing Apparatus]

Figure 1:
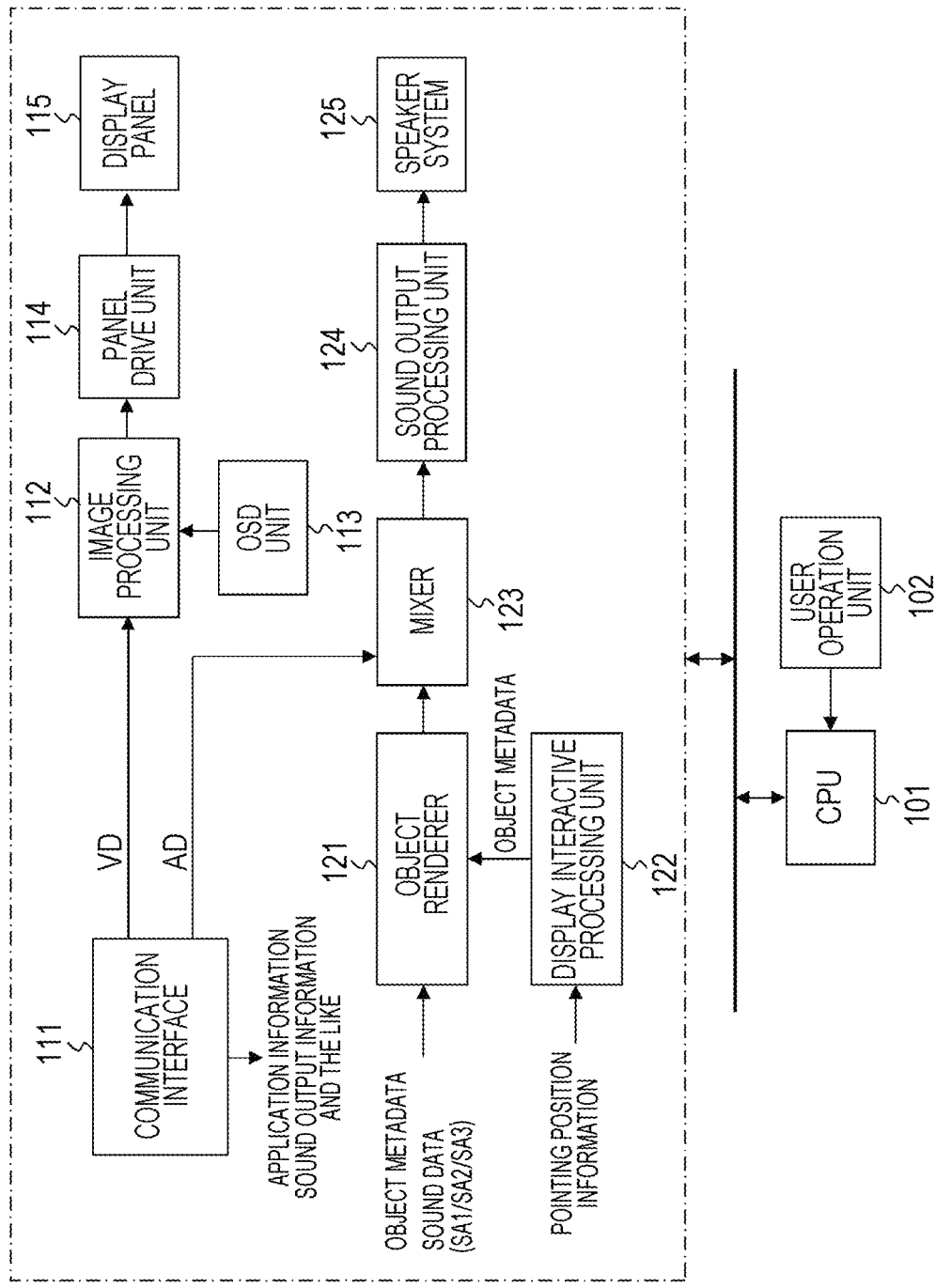
FIG. 1 is a block diagram illustrating a configuration example of an information processing apparatus as an embodiment.

FIG. 1 is a block diagram illustrating a configuration example of an information processing apparatus 100 as an embodiment. The information processing apparatus 100 accesses, for example, a server on a net such as the Internet, acquires desired information, and presents the information to the user.

The information processing apparatus 100 includes a central processing unit (CPU) 101 and a user operation unit 102. Furthermore, the information processing apparatus 100 further includes a communication interface 111, an image processing unit 112, an on screen display (OSD) unit 113, a panel drive unit 114, and a display panel 115. Furthermore, the information processing procedure 100 includes an object renderer 121, a display interactive processing unit 122, a mixer 123, a sound output processing unit 124, and a speaker system 125.

The CPU 101 controls an operation of each unit of the information processing apparatus 100. The user operation unit 102 is a user interface for a user to perform various operations, and is connected to the CPU 101. The user operation unit 102 includes, in addition to a keyboard, a touch panel and the like, a pointing device, such as a mouse, for performing an operation by pointing at an arbitrary position on the screen.

The communication interface 111 accesses a server on a net such as the Internet to acquire image data VD and sound data AD for information presentation. Note that, although illustration is omitted, the communication interface 111 also has a decoding function, and decoding of coded data of an image and a sound acquired by communication is also performed here. Furthermore, the communication interface 111 also acquires information of an application associated with a display image as well as information for outputting a sound corresponding to a pointing position by a user operation, and the like, and sends the information to the CPU 101. The information of an application also includes display position information indicating where on a screen an application logo (shortcut) for activating the application is to be arranged.

The image processing unit 112 performs scaling processing, image quality adjustment processing, and the like for the image data VD acquired by the communication interface 111 to obtain display image data. The OSD unit 113 generates a graphical user interface (GUI) display signal under control of the CPU 101. The GUI display signal includes a display signal for displaying the application logo (shortcut) for activating the application, a display signal for displaying an arrow indicating the pointing position, and the like. The GUI display signal is sent to the image processing unit 112 and superimposed on the image data.

The panel drive circuit 114 drives the display panel 115 on the basis of the display image data obtained in the image processing unit 114. The display panel 115 is configured by, for example, a liquid crystal display (LCD), an organic electroluminescence (EL) display, or the like.

The mixer 123 synthesizes sound data (sound channel data) AD acquired by the communication interface 111 or sound data generated inside the information processing apparatus 100, and sound channel data for outputting a sound corresponding to the pointing position obtained by the object renderer 121. The sound output processing unit 124 performs necessary processing such as D/A conversion and amplification for the sound channel data obtained by the mixer 123 and supplies the processed data to the speaker system 125. The speaker system 125 includes a speaker of a plurality of channels, in this embodiment, four channels arranged at respective positions of top left (TL), bottom left (BL), top right (TR), and bottom right (BR) of the screen.

As described above, the communication interface 111 acquires information for outputting a sound corresponding to the pointing position by the user operation, and sends the information to the CPU 101. This information includes sound data for outputting a sound according to the pointing position of the user on the screen.

As the sound data for outputting a sound according to the pointing position of the user, sound data SA2 used in a case where the pointing position is in a rectangular region (logo region) of the application logo (shortcut) arranged on the screen is included. This sound data SA2 exists by the types of application logos arranged on the screen. The sound data SA2 is accompanied by object metadata used in rendering processing for obtaining sound channel data for setting a position corresponding to the arrangement position on the screen of the application logo (shortcut) as a sound image position, in other words, an object position.

Furthermore, as the sound data for outputting a sound according to the pointing position of the user, sound data SA1 used in a case where the pointing position is in a background region that is on the screen but is not the rectangular region of the application logo is included. Moreover, as the sound data for outputting a sound according to the pointing position of the user, sound data SA3 in a case where the pointing position is outside the screen is included. Note that the type of the sound data SA3 is not one, and a plurality of types according to a protruding direction, for example, or four types, for example, top and bottom and right and left exist.

Figure 2:
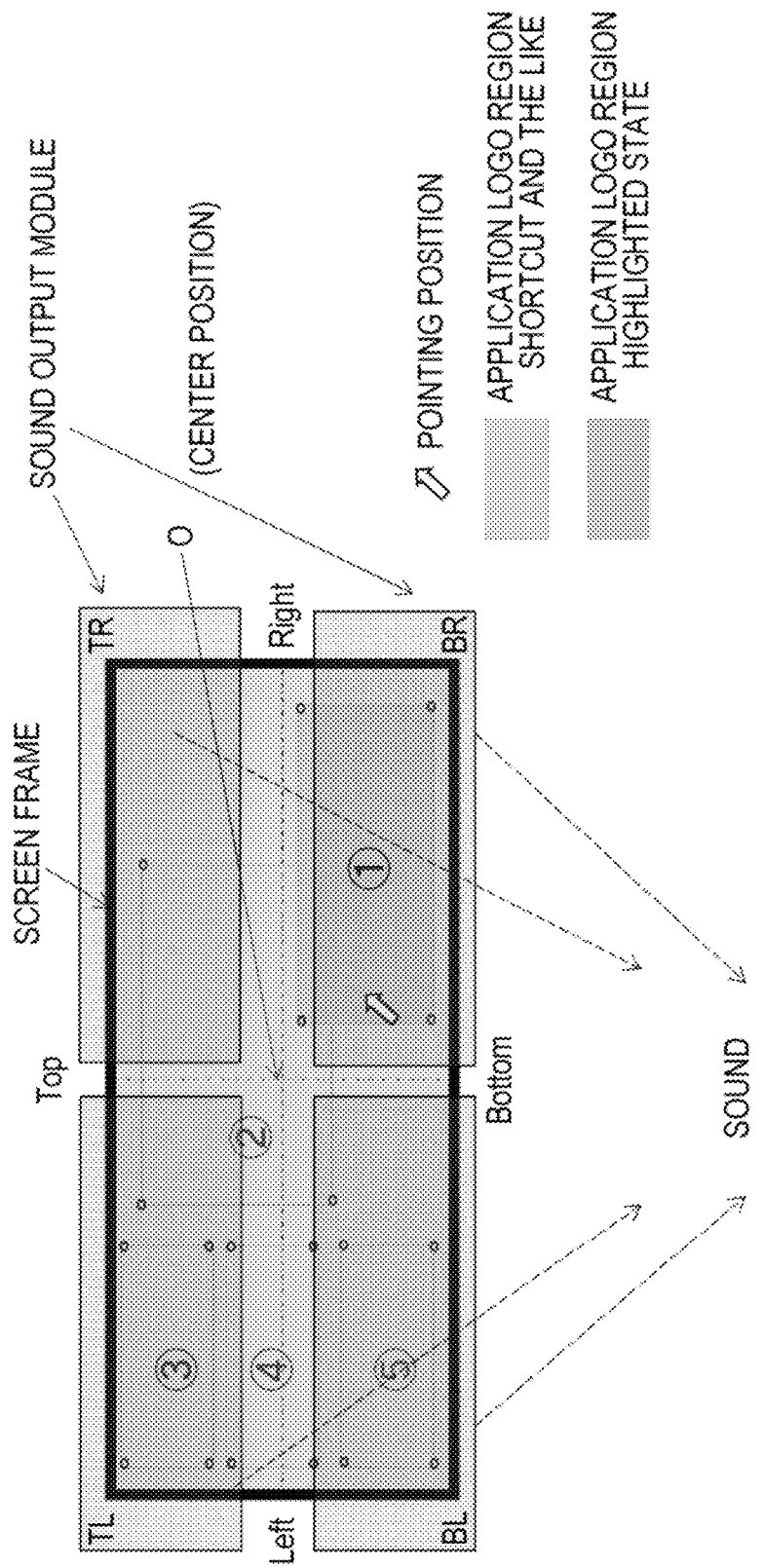
FIG. 2 is a diagram illustrating an example of a screen configuration.

FIG. 2 illustrates an example of a screen configuration. In the illustrated example, a black thick solid rectangular frame represents a screen frame of the display panel 115. Sound output modules (speakers) respectively corresponding to four divided positions are arranged on a back side of the screen frame. Sound output modules configured by the display panel 115 itself and integrated with the screen are also included as the sound output modules.

Rectangular regions of an application logo for activating a specific application shown with circles 1 to 5 on the background exist on the screen. An application logo (such as a shortcut) is displayed in the rectangular region (logo display is omitted in FIG. 2).

The white arrow represents, for example, a mouse cursor and indicates the pointing position by the user operation. When the pointing position is within the rectangular region of the application logo, the rectangular region is in a highlighted state. In the illustrated example, since the pointing position is within the rectangular region of circle 1, the rectangular region is in the highlighted state.

Furthermore, in the illustrated example, an intersection point of one dot chain lines of "Top-Bottom" and "Left-Right" is a center position (O) and serves as a reference point, and where the pointing position currently exists is known by top, bottom, left, and right offsets with respect to the reference point. The pointing position is moved by the user operation from the user operation unit 102, and the CPU 101 always grasps the pointing position. The center position (O) is provided as a reference in determining a positional relationship with the screen when detecting the pointing position, and is positional coordinates of a vector for reproducing, in a sound field, information of the pointing position viewed from the position of a viewer/listener, when the display interactive processing unit 122 converts a position detection result into object position information (θ, φ, r).

[1. In a Case where the Pointing Position P(x, y) is in the Background Region]

Figure 3:
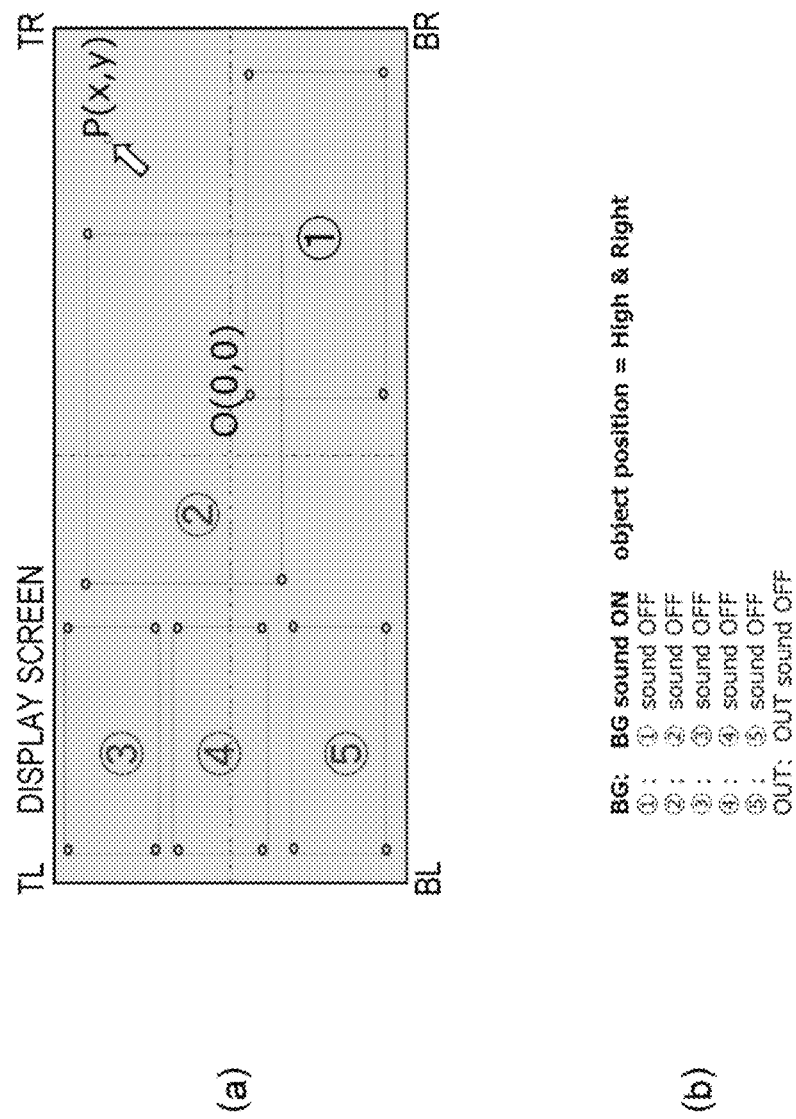
FIG. 3 is diagrams for describing a case where a pointing position P(x, y) is in a background region.

FIG. 3(*a*) illustrates a state in which the pointing position P(x, y) is in the background region. The CPU 101 always grasps the pointing position P(x, y), as described above. Further, since the CPU 101 controls generation of the display signal of each application logo, the CPU 101 also grasps the rectangular region of each application logo on the screen. In this case, the CPU 101 recognizes that the pointing position P(x, y) is not in the rectangular region of each application logo and is in the background region.

In this case, the CPU 101 determines use of the above-described sound data SA1 in order to output a sound indicating that the pointing position P(x, y) is in the background region that is on the screen but is not the region of the application logo, and sends the sound data SA1 (BG sound) to the object renderer 121 (see FIG. 3(*b*)). Furthermore, in this case, the CPU 101 determines that the pointing position P(x, y) is set as the sound image position, that is, the object position. In this example, the object position is set to an upper right (High & Right) position on the screen (see FIG. 3(*b*)).

In this case, the CPU 101 sends information of the pointing position P(x, y) to the display interactive processing unit 122. The display interactive processing unit 122 obtains the position information (θ, φ, r) configuring the object metadata on the basis of the information of the pointing position P(x, y). Here, θ represents azimuth, φ represents elevation, and r represents radius.

Figure 4:
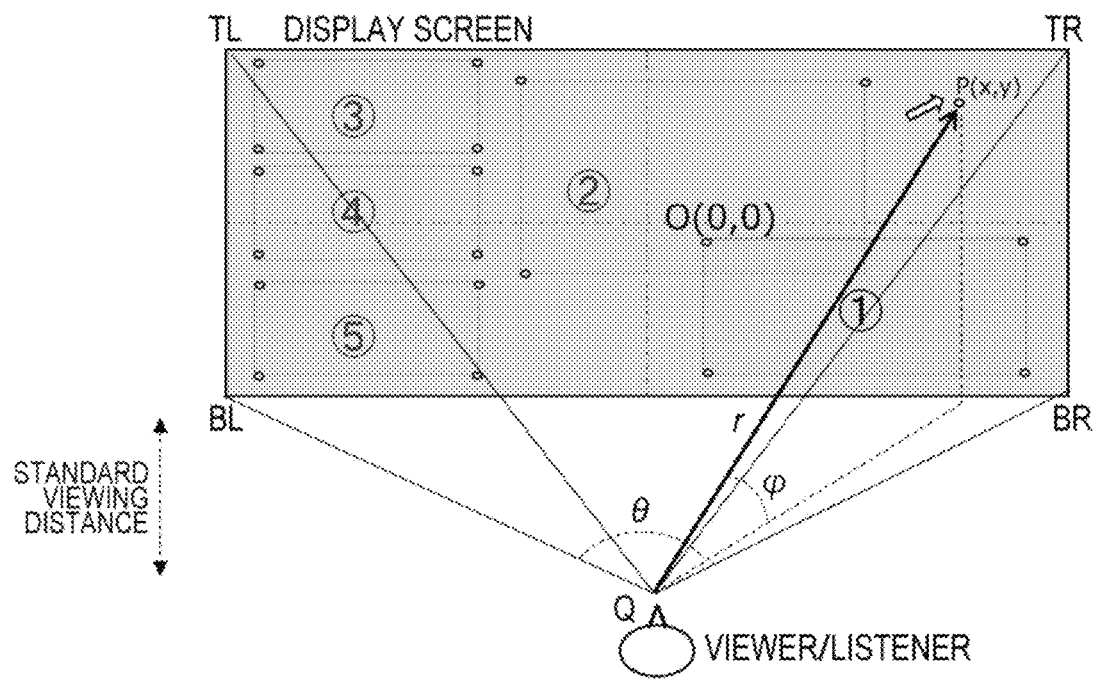
FIG. 4 is a diagram schematically illustrating elements of position information ($\theta$, $\varphi$, r) calculated from information of the pointing position P(x, y) by a display interactive processing unit.

FIG. 4 schematically illustrates elements of the position information (θ, φ, r) calculated from the information of the pointing position P(x, y) by the display interactive processing unit 122. r represents a distance from a viewing position, and an actual measurement value of a sensor or the like can be applied. Alternatively, a distance called standard viewing distance is used in place of the actual measurement value as illustrated, and the distance in consideration of an angle derived from e may be applied. Here, the standard viewing distance is said to be about 3 times a vertical size of a monitor (display panel) and about 1.5 times in UHD (4K) resolution.

The object renderer 121 performs rendering processing for the sound data SA1 (BG sound) using the object metadata calculated by the display interactive processing unit 122 to generate sound channel data for setting the position corresponding to the pointing position P(x, y) as the object position.

Figure 5:
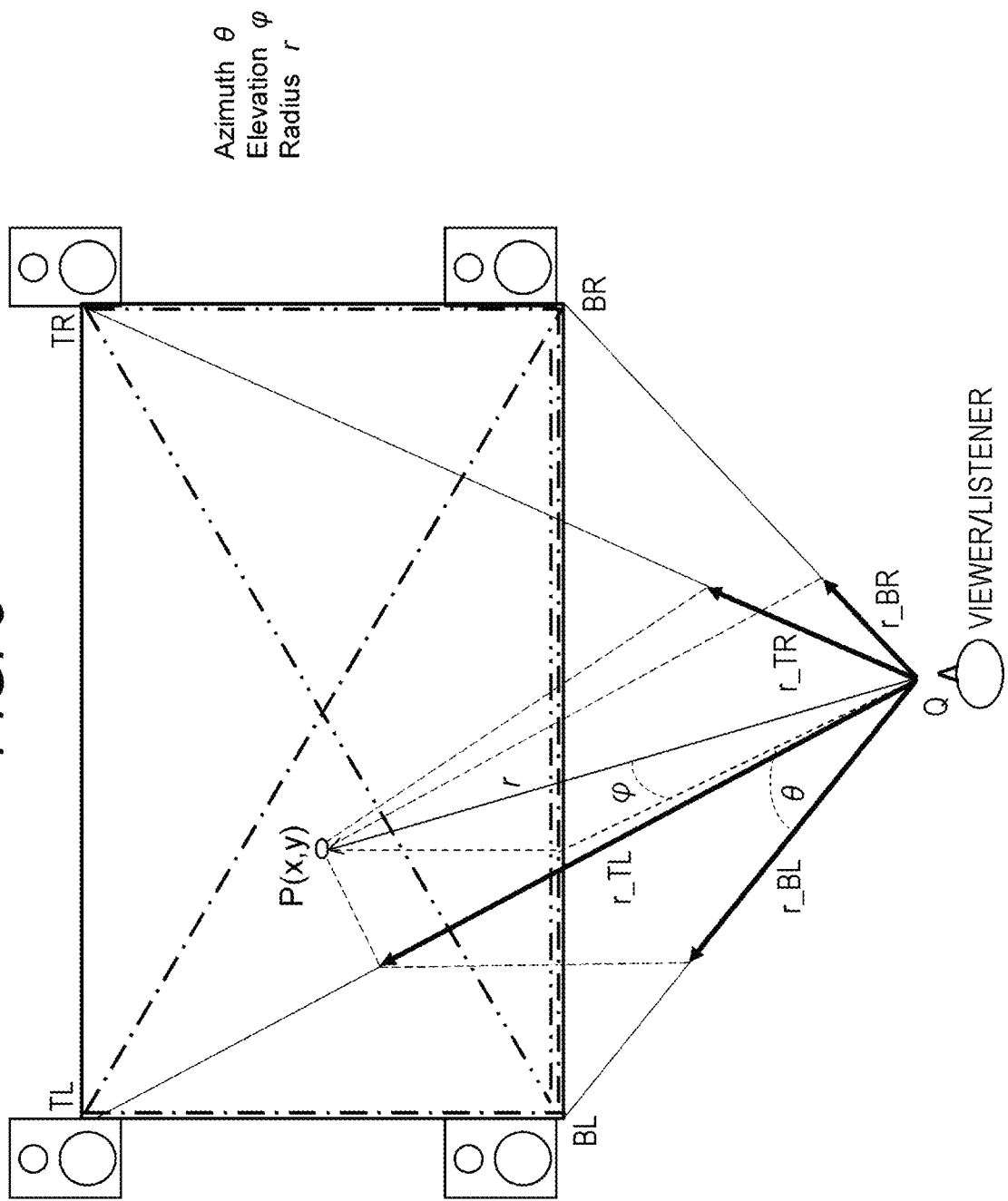
FIG. 5 is a diagram illustrating an outline of rendering processing in an object renderer.

FIG. 5 illustrates an outline of the rendering processing in an object renderer 121. In this rendering processing, in each of triangular regions (TL-BL-BR) and (TR-BL-BR) configured by three speakers, a position of a virtual sound image P(x, y) is determined by synthesizing the triangular regions using the position information (θ, φ, r) configuring object data.

The position of P(x, y) is expressed by r, φ, and θ as illustrated in FIG. 5 and is projected on vectors r_TL, r_BL, r_TR, and r-BR on axes Q-TL, Q-BL, Q-TR, and Q-BR extended from a point Q to the respective speaker positions. In this case, the position of P(x, y) is projected to (r_TL, r_BL, r_BR) in the triangular region TL-BL-BR. Sound pressures corresponding to vector amounts of these three vectors are applied to the channel data to the speakers.

Meanwhile, the position of P(x, y) is projected to (r_TR, r_BL, r_BR) in the triangular region TR-BL-BR. Sound pressures corresponding to vector amounts of these three vectors are applied to the channel data to the speakers. By synthesizing the vector amounts projected for the individual vectors between the two triangular regions, a synthesized sound output to be output from the four speakers can be obtained.

The object renderer 121 sends the sound channel data obtained by the above-described rendering processing to the mixer 123. As a result, the speaker system 125 outputs a sound indicating that the pointing position P(x, y) is in the background region. Therefore, the user can know by the sound that the pointing position P(x, y) is in the background region.

Furthermore, the sound image position, that is, the object position, is a position corresponding to the pointing position P(x, y). In the example in FIG. 3, the object position is set to the upper right (High & Right) position on the screen. Therefore, the user can know an approximate position on the screen of the pointing position by the direction in which the sound can be heard.

[2. In a Case where the Pointing Position P(x, y) is in the Region of the Application Logo]

Figure 6:
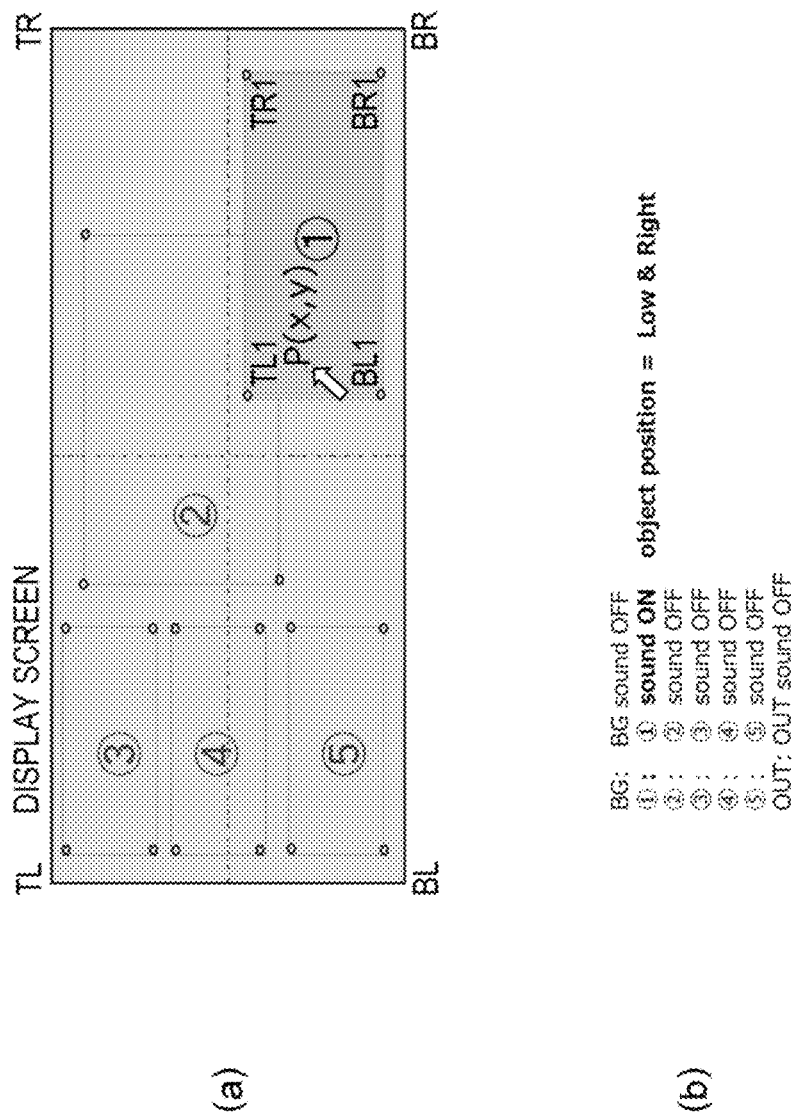
FIG. 6 is diagrams for describing a case where the pointing position P(x, y) is in a region of an application logo.

FIG. 6(*a*) illustrates a state in which the pointing position P(x, y) is in the rectangular region of the application logo of circle 1. The CPU 101 always grasps the pointing position P(x, y), as described above. Further, since the CPU 101 controls generation of the display signal of each application logo, the CPU 101 also grasps the rectangular region of each application logo on the screen. In this case, the CPU 101 recognizes that the pointing position P(x, y) is in the rectangular region of the application logo of circle 1.

In this case, the CPU 101 determines use of the above-described sound data SA2 in order to output a sound indicating that the pointing position P(x, y) is in the rectangular region of the application logo of circle 1, and sends the sound data SA2 (circle 1 sound) to the object renderer 121 (see FIG. 6(*b*)).

Furthermore, the CPU 101 determines that the position corresponding to the pointing position P(x, y) is set as a sound output position, that is, the object position. In this example, the object position is set to a lower right (Low & Right) position on the screen (see FIG. 6(*b*)). In this case, the CPU 101 sends the object metadata accompanying the sound data SA2 (circle 1 sound) to the object renderer 121. The object metadata is set such that the object position is set to the lower right (Low & Right) position on the screen.

Incidentally, the object metadata accompanying the sound data SA2 (circle 2 sound) is set such that the object position is set to a center position on the screen. Furthermore, the object metadata accompanying the sound data SA2 (circle 3 sound) is set such that the object position is set to an upper left (High & Left) position on the screen.

Furthermore, the object metadata accompanying the sound data SA2 (circle 4 sound) is set such that the object position is set to a center left (Center & Left) position on the screen. Moreover, the object metadata accompanying the sound data SA2 (circle 5 sound) is set such that the object position is set to a lower left (Low & Left) position on the screen.

Note that, in this case, by controlling the value of r of the object metadata, the positional relationship in the depth direction between the object positions of the rectangular regions of the application logos that spatially overlap with each other can be expressed.

Figure 7:
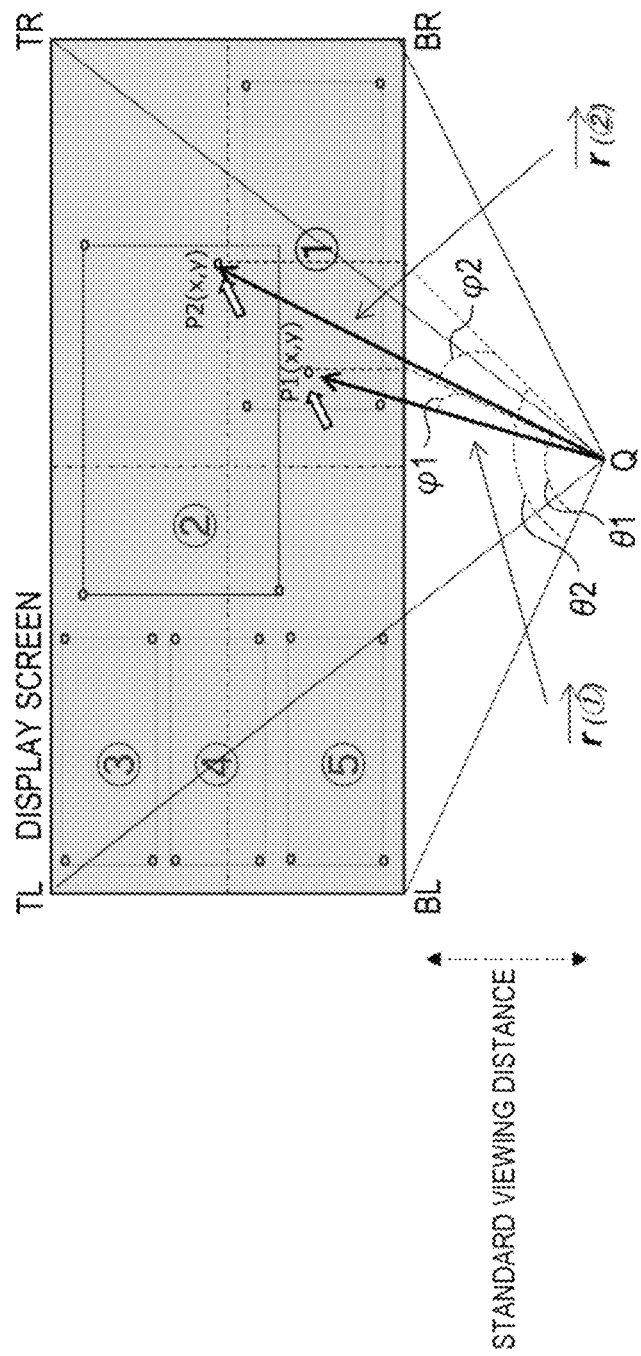
FIG. 7 is a diagram for describing a positional relationship in a depth direction of an object position in a rectangular region of an application logo.

A case in which the rectangular region of the application logo of circle 1 is arranged in front of the rectangular region of the application logo of circle 2 will be considered using FIG. 7. In this case, the relationship of (the magnitude of the vector r (circle 1))<(the magnitude of the vector r (circle 2)) is satisfied. By setting the value of r of the object metadata in this manner, the rectangular region of the application logo of circle 1 being in front of the rectangular region of the application logo of circle 2 can be detected by a sound, when the pointing position is P1$(x, y)$ and in the rectangular region of the application logo of circle 1, and when the pointing position is P2$(x, y)$ and in the rectangular region of the application logo of circle 2.

When the pointing position P(x, y) is in the rectangular region of the application logo of circle 1, the object renderer 121 performs the rendering processing for the sound data SA2 (circle 1 sound), using the object metadata accompanying the sound data SA2, to generate sound channel data for setting the position corresponding to the rectangular region of the application logo of circle 1, where the pointing position P(x, y) exists, as the object position. Description of the rendering processing in the object renderer 121 is similar to the above-described description using FIG. 5 and is thus omitted here.

The object renderer 121 sends the sound channel data obtained by the rendering processing to the mixer 123. As a result, the speaker system 125 outputs a sound indicating that the pointing position P(x, y) is in the rectangular region of the application logo of circle 1. Therefore, the user can know by the sound that the pointing position P(x, y) is in the rectangular region of the application logo of circle 1.

Furthermore, the sound image position, in order words, the object position is the position corresponding to the rectangular region of the application logo of circle 1. In the example in FIG. 6, the object position is set to the lower right (Low & Right) position on the screen. Therefore, the user can know the approximate position on the screen of the rectangular region of the application logo of circle 1 by the direction in which the sound can be heard.

Note that, in the above description, a state in which the pointing position P(x, y) is in the rectangular region of the application logo of circle 1 has been described. Although detailed description is omitted, a state in which the pointing position P(x, y) is in a region of another application logo is similarly handled. Furthermore, in the above description, an example of using the object metadata accompanying the sound data as the object metadata to be used for the rendering processing has been described. However, object metadata calculated from the pointing position P(x, y) by the display interactive processing unit 122 can also be used.

Figure 8:
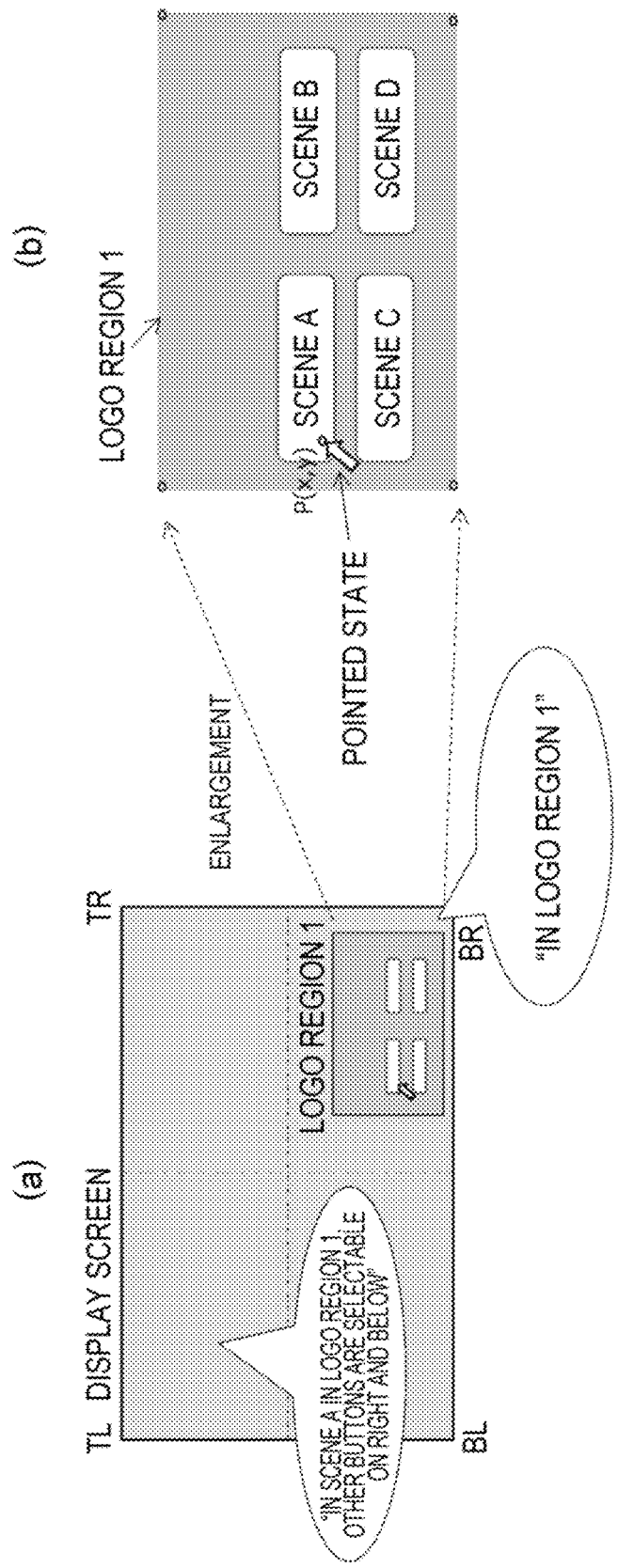
FIG. 8 is a diagram for describing a case where selectable buttons exist in a logo region.

Furthermore, in the above description, an example in which there is no selectable button in the rectangular region (logo region) of the application logo has been described. However, as illustrated in FIGS. 8(a) and 8(b), there are some cases where a selectable button exists in a logo region 1. In this case, in a state where the pointing position P(x, y) is in a predetermined button region in the logo region 1, a sound indicating that the pointing position P(x, y) is in the logo region 1 is output as described above, and at the same time, a sound indicating that the pointing position P(x, y) is in the predetermined button region is output.

In the illustrated example, the communication interface 111 (see FIG. 1) acquires sound output information associated with the logo region 1. This sound output information includes sound data for outputting the sound indicating that the pointing position is in the logo region 1 and object metadata accompanying the sound data, and further includes, for each button, sound data for outputting the sound indicating that the pointing position is in the button region and object metadata accompanying the sound data.

For example, the object metadata accompanying the sound data of the logo region 1 is set such that the object position is set to the lower right (Low & Right) position on the screen. Furthermore, the object metadata accompanying the sound data of the button regions of "scene A", "scene B", "scene C", and "scene D" are set such that the respective object positions are set to the upper left (High & Left) position, the upper right (High & Right) position, the lower left (Low & Left) position, and the lower right (Low & Right) position on the screen.

As illustrated, in the state where the pointing position P(x, y) is in the button region of "scene A", the CPU 101 sends the sound data of the logo region 1 and the object metadata accompanying the sound data and sends the sound data of the button region of "scene A" and the object metadata accompanying the sound data to the object renderer 121 (see FIG. 1).

The object renderer 121 performs the rendering processing using the object metadata, for the sound data, to generate sound channel data for setting a position corresponding to the logo region 1, here, the lower right (Low & Right) position on the screen as the object position, and sends the sound channel data to the mixer 123 (see FIG. 1).

Thereby, the sound indicating that the pointing position is in the logo region 1, for example, a sound of "in the logo region 1" is output from the speaker system 125. In this case, the sound image position, in other words, the object position is set to the lower right (Low & Right) position on the screen, as illustrated in FIG. 8(a).

Furthermore, as illustrated, in the state where the pointing position P(x, y) is in the button region of "scene A", the CPU 101 sends the sound data of the button region of "scene A" and the object metadata accompanying the sound data to the object renderer 121 (see FIG. 1).

The object renderer 121 performs the rendering processing using the object metadata, for the sound data, to generate the sound channel data for setting the position corresponding to the button region of "scene A", here, the upper left (High & Left) position on the screen as the object position, synthesizes the sound channel data with the above-described sound channel data of the logo region 1, and sends the synthesized sound channel data to the mixer 123 (see FIG. 1).

Thereby, a sound indicating that the pointing position is in the button region of "scene A", for example, a sound of "In the scene A in the logo region 1. Other buttons are selectable to the right and below" is output at the same time with the sound indicating that the pointing position is in the logo region 1, from the speaker system 125. In this case, the sound image position, in other words, the object position is set to the upper left (High & Left) position on the screen so that the relative positional relationship between the buttons can be grasped as illustrated in FIG. 8(a).

Note that, although detailed description is omitted, similar processing is performed even in a state where the pointing position P(x, y) is in another button region, and the sound indicating that the pointing position is in the logo region 1 and a sound indicating that the pointing position is in the button region are output at the same time at respectively set object positions.

[3. In a Case where the Pointing Position P(x, y) is Outside the Screen]

Figure 9:
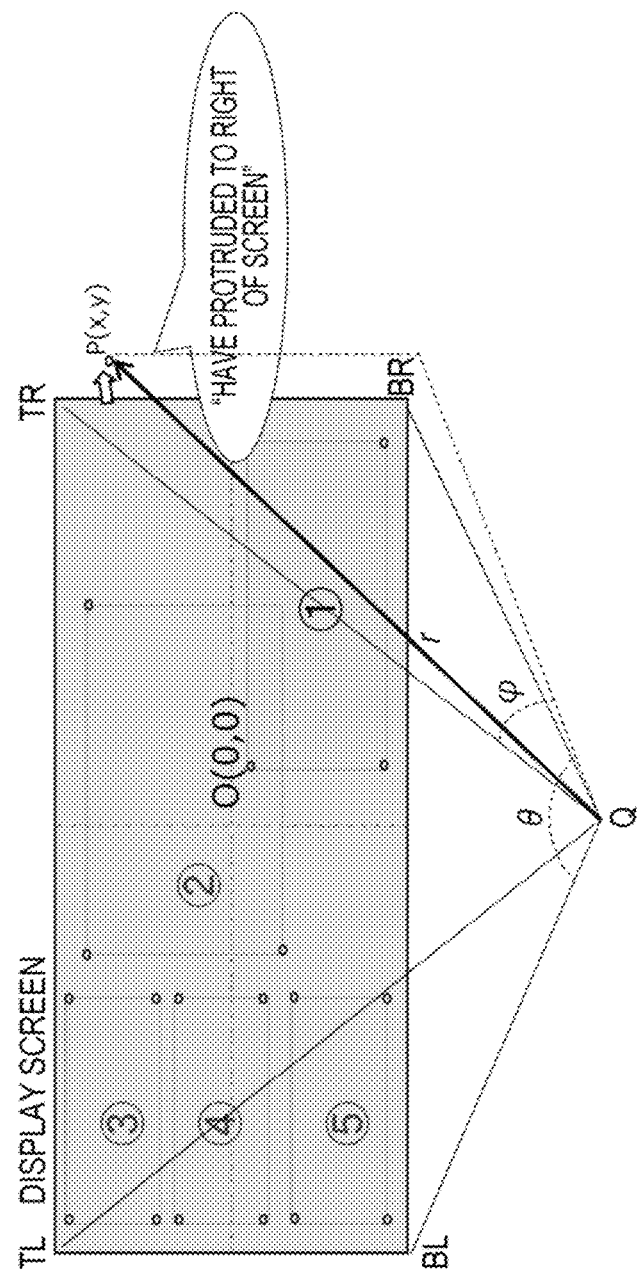
FIG. 9 is a diagram for describing a case where the pointing position P(x, y) is outside a screen.

FIG. 9 illustrates a state in which the pointing position P(x, y) is outside the screen, in this example, on a right side of the screen. The CPU 101 always grasps the pointing position P(x, y), as described above. In this case, the CPU 101 recognizes that the pointing position P(x, y) protrudes to the right side of the screen.

In this case, the CPU 101 determines use of the above-described sound data SA3 in order to output a sound indicating that the pointing position P(x, y) protrudes to the right side of the surface, and sends the sound data SA3 (OUT sound) to the object renderer 121. Furthermore, in this case, the CPU 101 determines that the pointing position P(x, y) is set as the sound image position, that is, the object position. In this example, the object position is a position protruding to the upper right with respect to the screen.

In this case, the CPU 101 sends information of the pointing position P(x, y) to the display interactive processing unit 122. The display interactive processing unit 122 obtains the position information (θ, φ, r) configuring the object metadata on the basis of the information of the pointing position P(x, y). Detailed description of the position information (θ, φ, r) is similar to the above description using FIG. 4 and is thus omitted here.

The object renderer 121 performs the rendering processing for the sound data SA3 (OUT sound) using the object metadata calculated by the display interactive processing unit 122 to generate sound channel data for setting the position corresponding to the pointing position P(x, y) as the object position. Description of the rendering processing in the object renderer 121 is similar to the above-described description using FIG. 5 and is thus omitted here.

The object renderer 121 sends the sound channel data obtained by the rendering processing to the mixer 123. Thereby, a sound indicating that the pointing position P(x, y) is outside the screen, here, the pointing position has protruded to the right side, for example, a sound of "has protruded to the right of the screen" is output from the speaker system 125. Therefore, the user can know by the sound that the pointing position P(x, y) has protruded to the right side of the screen.

Furthermore, the sound image position, that is, the object position, is a position corresponding to the pointing position P(x, y). In this example in FIG. 9, the object position is a position protruding to the upper right with respect to the screen. Therefore, the user can know the approximate position on the screen of the pointing position by the direction in which the sound can be heard.

As described above, in a case where the pointing position P(x, y) is in the background, the rectangular region of the application logo, or a position such as outside of the screen, the information processing apparatus 100 illustrated in FIG. 1 outputs a sound corresponding to the position. Therefore, a visually impaired person can easily perform an operation by pointing at a desired position on the screen by being assisted by the sound output.

Furthermore, the information processing apparatus 100 illustrated in FIG. 1 sets the sound image position (object position) when outputting the sound corresponding to the pointing position P(x, y) to the position corresponding to the pointing position P(x, y). Therefore, where on the screen the pointing position exists can be grasped from the direction in which the sound can be heard.

2. Modification

Note that, in the above embodiment, an example in which the rectangular region of the application logo (shortcut) for activating a specific application on the screen is arranged has been described. The region arranged on the screen is not limited to the above example, and another region where the user can perform an operation by pointing at the region may also be adopted. For example, in an apparatus for reproducing content, a logo region for selecting reproduction content or the like may be adopted.

Furthermore, the present technology can also have the following configurations.

(1) An information processing apparatus including: a control unit configured to control position detection processing of detecting a pointing position of a user on a screen, and sound output processing of outputting a sound corresponding to the detected pointing position.

(2) The information processing apparatus according to (1), in which,
in the sound output processing,
when the detected pointing position is in a specific region on the screen, a sound indicating that the pointing position is the specific region is output.

(3) The information processing apparatus according to (2), in which
the specific region is a region of an application logo for activating a specific application arranged on the screen.

(4) The information processing apparatus according to any one of (1) to (3), in which,
in the sound output processing,
when the detected pointing position is not on the screen, a sound indicating that the pointing position is outside the screen is output.

(5) The information processing apparatus according to (1), in which,
in the sound output processing,
when the detected pointing position is in a second specific region existing in a first specific region on the screen, a sound indicating that the pointing position is the second specific region is output at a same time with an output of a sound indicating that the pointing position is the first specific region.

(6) The information processing apparatus according to any one of (1) to (5), in which,
in the sound output processing,
processing of setting a position corresponding to the detected pointing position as a sound image position is performed.

(7) The information processing apparatus according to (6), in which,
in the sound output processing,
rendering processing according to object metadata corresponding to the pointing position is performed in order to set the position corresponding to the detected pointing position as the sound image position.

(8) The information processing apparatus according to (7), in which,
in the sound output processing,
rendering processing according to object metadata prepared in advance in association with a position on the screen is performed.

(9) The information processing apparatus according to (7), in which, in the sound output processing,
rendering processing according to object metadata obtained from the detected pointing position is performed.

(10) An information processing method including:
a position detection step of detecting a pointing position of a user on a screen; and
a sound output step of outputting a sound corresponding to the detected pointing position.

(11) An information processing apparatus including:
a display unit configured to display a screen;
a user operation unit configured to point at, by a user, an arbitrary position on the screen;
a position detection unit configured to detect a pointing position of the user on the screen; and
a sound output unit configured to output a sound corresponding to the detected pointing position.

A main characteristic of the present technology is to enable a visually impaired person to easily perform an operation by pointing at a desired position on a screen, by outputting a sound corresponding to a pointing position (see FIGS. 1, 3, 4, and 9). Furthermore, a main characteristic of the present technology is to make where on a screen a pointing position exists graspable from a direction in which a sound can be heard, by performing processing of setting a sound image position in outputting the sound corresponding to the pointing position as a position corresponding to the pointing position (see FIGS. 1, 3, 4, and 9).

REFERENCE SIGNS LIST

100 Information processing apparatus
101 CPU
102 User operation unit
111 Communication interface
112 Image processing unit
113 OSD unit
114 Panel drive unit
115 Display panel
121 Object renderer
122 Display interactive processing unit
123 Mixer
124 Sound output processing unit
125 Speaker system

The invention claimed is:

1. An information processing apparatus comprising:
processing circuitry configured to
control position detection processing of detecting a pointing position of a user on a screen, and control sound output processing of outputting a sound corresponding to the detected pointing position,
wherein, in the sound output processing, when the detected pointing position is in a second specific region existing in a first specific region on the screen, a sound indicating that the pointing position is the second specific region is output at a same time with an output of a sound indicating that the pointing position is the first specific region.

2. The information processing apparatus according to claim 1, wherein, in the sound output processing, when the detected pointing position is in the first specific region on the screen, the sound indicating that the pointing position is the first specific region is output.

3. The information processing apparatus according to claim 2, wherein
the first specific region is a region of an application logo for activating a specific application arranged on the screen.

4. The information processing apparatus according to claim 1, wherein,
in the sound output processing, when the detected pointing position is not on the screen, a sound indicating that the pointing position is outside the screen is output.

5. The information processing apparatus according to claim 1, wherein, in the sound output processing, the processing circuitry is configured to perform processing of setting a position corresponding to the detected pointing position as a sound image position.

6. The information processing apparatus according to claim 5, wherein,
in the sound output processing, rendering processing according to object metadata corresponding to the pointing position is performed in order to set the position corresponding to the detected pointing position as the sound image position.

7. The information processing apparatus according to claim 6, wherein, in the sound output processing, the rendering processing according to the object metadata, which is prepared in advance in association with positions on the screen, is performed.

8. The information processing apparatus according to claim 6, wherein, in the sound output processing, the rendering processing according to the object metadata, which is obtained from the detected pointing position is performed.

9. The information processing apparatus according to claim 1, wherein
the first specific region is a logo region and the second specific region is a button region,
the sound indicating that the pointing position is the second specific region is a sound indicating that the pointing position is the button region, and
the sound indicating that the pointing position is the first specific region is a sound indicating that the pointing position is the logo region.

10. An information processing method comprising:
detecting a pointing position of a user on a screen; and
outputting a sound corresponding to the detected pointing position,
wherein, in the outputting, when the detected pointing position is in a second specific region existing in a first specific region on the screen, a sound indicating that the pointing position is the second specific region is output at a same time with an output of a sound indicating that the pointing position is the first specific region.

11. The information processing method according to claim 10, wherein, in the outputting, when the detected pointing position is in the first specific region on the screen, the sound indicating that the pointing position is the first specific region is output.

12. The information processing method according to claim 11, wherein
the first specific region is a region of an application logo for activating a specific application arranged on the screen.

13. The information processing method according to claim 10, wherein,
in the outputting, when the detected pointing position is not on the screen, a sound indicating that the pointing position is outside the screen is output.

14. The information processing method according to claim 10, wherein,
in the outputting, the method further comprises performing processing of setting a position corresponding to the detected pointing position as a sound image position.

15. The information processing method according to claim 14, wherein,
in the outputting, rendering processing according to object metadata corresponding to the pointing position is performed in order to set the position corresponding to the detected pointing position as the sound image position.

16. The information processing method according to claim 15, wherein, in the outputting, the rendering processing according to the object metadata, which is prepared in advance in association with positions on the screen, is performed.

17. The information processing method according to claim 15, wherein, in the outputting, the rendering processing according to the object metadata, which is obtained from the detected pointing position, is performed.

18. The information processing method according to claim 10, wherein
the first specific region is a logo region and the second specific region is a button region,
the sound indicating that the pointing position is the second specific region is a sound indicating that the pointing position is the button region, and
the sound indicating that the pointing position is the first specific region is a sound indicating that the pointing position is the logo region.

19. An information processing apparatus comprising:
a display configured to display a screen; and
processing circuitry configured to
receive a point input, by a user, at a position on the screen;
detect a pointing position of the user on the screen; and
output a sound corresponding to the detected pointing position,
wherein, in the outputting, when the detected pointing position is in a second specific region existing in a first specific region on the screen, a sound indicating that the pointing position is the second specific region is output at a same time with an output of a sound indicating that the pointing position is the first specific region.

* * * * *